Figure 1:
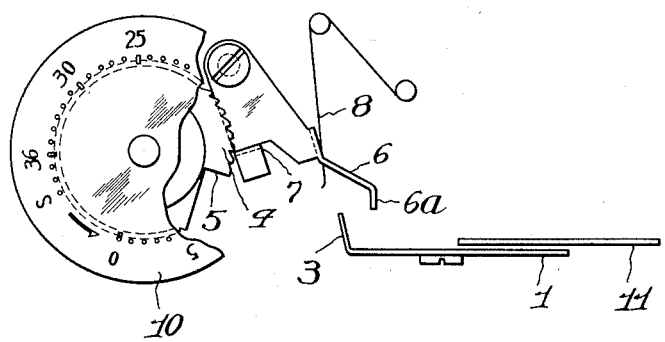

June 9, 1964  KUNIO IRISAWA ETAL  3,136,291
DEVICE FOR INDICATING COMPLETION OF EXPOSURE OF FILM
Filed May 17, 1962

Hideo Kokubo
Kunio Irisawa
Inventors by George B. Oujevolk
Attorney

United States Patent Office 3,136,291
Patented June 9, 1964

3,136,291
DEVICE FOR INDICATING COMPLETION OF
EXPOSURE OF FILM
Kunio Irisawa and Hideo Kokubo, Tokyo, Japan, assignors to Mamiya Koki Kabushiki Kaisha, Tokyo-to, Japan, a joint-stock company of Japan
Filed May 17, 1962, Ser. No. 195,565
2 Claims. (Cl. 116—114)

This invention relates to photographic cameras, and more particularly it relates to a new device which is installed within a photographic camera and indicates, within the field of vision of the view finder of the photographic camera, the completion of exposure of all frames, or a predetermined number of frames, of a film in the camera.

It is an object of the present invention to provide means for effectively preventing meaningless operation of a camera after all of the frames of a film have been exposed.

It is another object to provide means for effectively signaling the completion of exposure of a predetermined number of frames of a film in a camera.

It is a further object to provide such means as stated above which is of relatively simple construction and operation and requires little space.

The device of the present invention is most suitable for application to a camera provided with a reverse-count type of film frame counter (sometimes called film indicator), although it may be effectively applied also to cameras with other types of film frame counters.

The device according to this invention, briefly described, comprises a first means for signaling, in the field of vision of the view finder of the camera, the completion of exposure of all or a predetermined number of frames of a film in the camera and a second means which operates the first said means for signaling, and which is coupled to the film frame counter of the camera and is actuated thereby upon the said completion of exposure.

Figure 2:
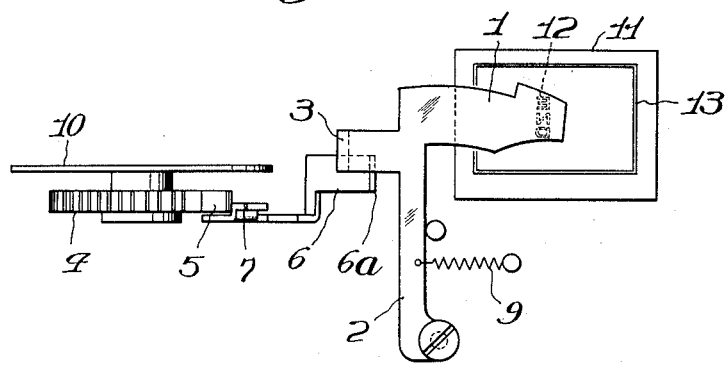

The details of the invention as well as the manner in which its objects may best be achieved will be clearly apparent by reference to the following description of a representative embodiment of the invention when taken in conjunction with the accompanying drawing in which the same parts are designated by the same reference numerals, and in which:

FIG. 1 is a plan view, in diagrammatic form, and with parts cut away, showing the mechanism of the embodiment of the present invention; and FIG. 2 is an elevational view which is an orthogonal projection of the view shown in FIG. 1.

Referring to the drawing, an essentially three-cornered indicator plate 1 is provided with a shield at one corner fixed to a support member 2 which is rotatably pivoted at another corner and has a protruding engagement lug 3 at the third corner. A cutout 5 is provided at one part of a ratchet gear 4 for operating the film frame counter of the camera, the said counter being provided with a dial 10. A three-cornered actuating member 6 which is pivoted at one corner thereof is provided with a pawl 7 at a second corner, which is engaged with the ratchet gear 4, and a bent finger part 6a at the third corner which is engageable with the aforesaid engagement lug 3. A spring 8 is provided to apply a force on the actuating member 6 tending to press the pawl 7 against the ratchet gear 4. A spring 9 is provided to impart return force to the aforesaid support member 2.

The above-described mechanism is so designed that, when the ratchet gear is in the position at which its cutout 5 confronts the pawl 7, and the pawl is forced by the spring 8 to enter the cutout 5, whereby the actuating member 6, together with its bent part 6a, is rotated, and the bent finger part 6a, engaging with the engagement lug 3 of the support member 2, forces the support member 2 to rotate about its pivot against the force of the spring 9. Accordingly, the indicator plate 1 is displaced.

Thus, when the above-described device according to this invention is applied to a reverse-count type film counter, and the film counter reaches the calibration indication of "1," irrespective of whether a 20-frame film or a 36-frame film is used, and then, upon completion of exposure of the last frame corresponding to the said indication, the film is wound, the ratchet gear 4 is positioned so that its cutout 5 confronts the pawl 7, whereby the said device operates to cause displacement of the indicator plate 1 as described in the preceding paragraph.

The displacement of the indicator plate 1 is caused in the above-described manner can be utilized in several ways to indicate completion of exposure of all or a predetermined number of frames of a film as will be apparent.

Transparent letters, for example, the letters "END" as shown in FIG. 2, are provided on a bright-line panel 11 of the finder. The indicator plate 1 is adapted to be normally positioned directly in front of the said letters and in the close proximity of this bright-line panel 11 so as to shield the said letters from view, and to be displaced to reveal the said letters when the device of this invention operates, placing these letters, together with a bright-line 13 in the light path of the view finder.

Similarly, a window is provided in the bright-line panel 11, and the indicator plate 1 is so adapted that it is normally positioned to shield this window from view; then, when the indicator plate 1 is displaced, signal markings provided in one portion thereof are positioned directly in front of this window and are thereby revealed.

By utilizing the afore-described displacement of the indicator plate 1 in such a manner as indicated by the foregoing examples, a signal marking indicating the completion of exposure of all or a predetermined number of frames of the film is caused to be revealed in the light path of the camera view finder.

Since it is obvious that many changes and modifications can be made in the above-described details without departing from the nature and spirit of the invention, it is to be understood that the invention is not to be limited to the details described herein except as set forth in the appended claims.

What is claimed is:
1. A device for indicating the completion of exposure of film within the view finder of a camera comprising:
   a circular frame counter;
   a ratchet gear mounted axially with said counter for operating said counter, said gear defining a cutout portion along the peripheral gear surface;
   an essentially three-cornered actuating member comprising a pawl engaging said ratchet gear at one corner, means to pivot said actuating member at another corner, and a bent finger portion at a third corner;
   an essentially three-cornered indicator plate for indi- cating the completion of exposure comprising a lug for engaging said bent finger at one corner, means to pivot said indicator plate at another corner, and means to expose indicia on the view finder of the camera at a third corner;

and means to rotate said actuating member about said actuating member pivot when said pawl reaches the cutout portion of said ratchet gear, said bent finger portion thereby engaging said lug and rotating said indicator plate about said indicator plate pivot to move said indicia exposing means out of said view finder.

2. A device in accordance with claim 1 wherein said means to rotate said actuating member comprises spring means urging said pawl against said ratchet gear, and wherein said device further comprises a spring for biasing said indicator plate away from said actuating member.

References Cited in the file of this patent

UNITED STATES PATENTS

| | | |
|---|---|---|
| 247,577 | Payne | Sept. 27, 1881 |
| 2,229,848 | Harter et al. | Jan. 28, 1941 |
| 2,750,858 | Marvin et al. | June 19, 1956 |